No. 623,270. Patented Apr. 18, 1899.
L. BLOCK.
REFRIGERATING MACHINE.
(Application filed Jan. 12, 1895.)
(No Model.) 2 Sheets—Sheet 1.

Witnesses
M. B. Harris
M. F. Boyle

Inventor:
Louis Block
By Thomas Drew Stetson
Attorney

THE NORRIS PETERS CO., PHOTO-LITHO., WASHINGTON, D. C.

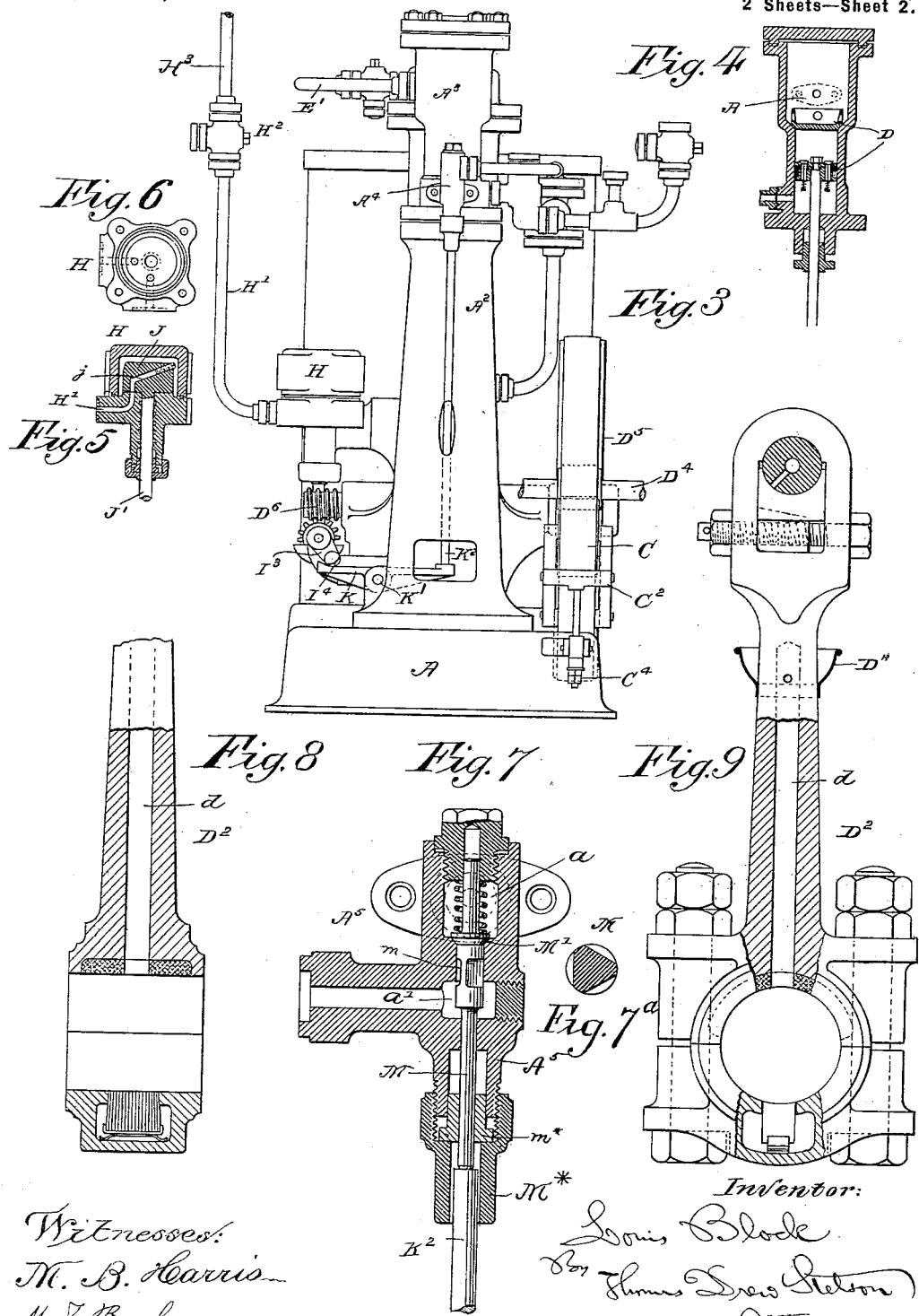

UNITED STATES PATENT OFFICE.

LOUIS BLOCK, OF NEW YORK, N. Y.

REFRIGERATING-MACHINE.

SPECIFICATION forming part of Letters Patent No. 623,270, dated April 18, 1899.

Application filed January 12, 1895. Serial No. 534,636. (No model.)

*To all whom it may concern:*

Be it known that I, LOUIS BLOCK, a citizen of the United States, residing in the city and county of New York and State of New York, have invented a certain new and useful Improvement Relating to Refrigerating - Machines, of which the following is a specification.

My improved machine is adapted to supply the demand for small refrigerating apparatus working on the same principle as the large machines which have been long employed in cooling breweries, manufacturing ice, and other uses in a large way. I employ the method long used in large machines of mechanically compressing ammonia-vapor, absorbing and conveying away by cold water the heat developed by the compression and the latent heat, and subsequently allowing the ammonia which has been thus liquefied to again expand into vaporous form, calling for a large amount of heat from surrounding bodies to accomplish its change of condition. I have combined all the parts in a single machine, which is compact in construction and arrangement, so that it occupies but a small space in a butcher-shop, where it may be employed to cool a large refrigerator, which may be an apartment of the building properly defended with non-conducting surfaces, or in any other place where it may be required. It is equipped for measuring definitely a small quantity of liquid ammonia into the refrigerating-coils at short intervals and for similarly measuring a small quantity of oil at equally short or at any other desired intervals into the compressor to lubricate and pack the piston and valves. It is also equipped so that oil which escapes through the stuffing-box of the compressor is used to lubricate the cross-head and crank-pin.

The machine may run like a well-equipped railroad-car, not requiring any labor or skill from an attendant except to vary the rate of the revolutions according to the changes in the weather and to refill with oil, to compensate for the amount of oil escaping to the several bearings, at intervals of several days or weeks.

The following is a description of what I consider the best means of carrying out the invention.

The accompanying drawings form a part of this specification.

Figure 1:
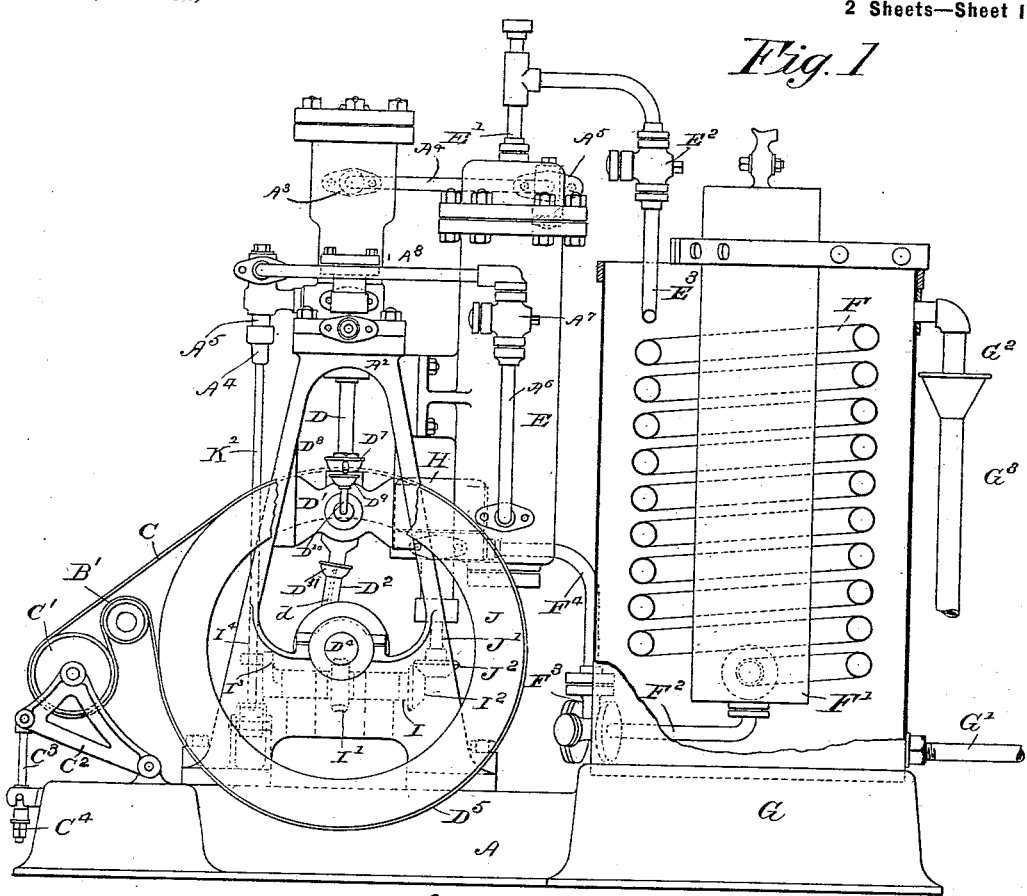
Figure 2:
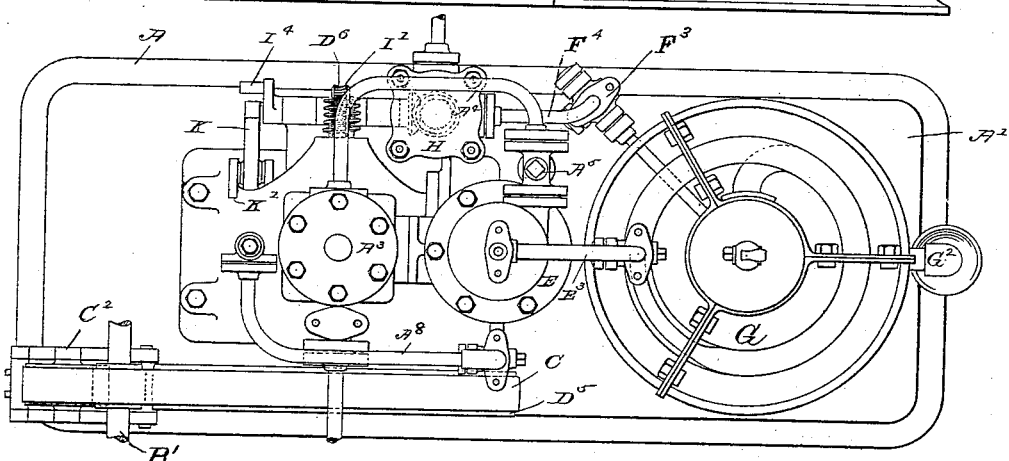

Figure 1 is a side elevation of the entire machine with the main portion of the condenser-tank in central vertical section and certain portions of the fly-wheel omitted to show the parts beyond. Fig. 2 is a corresponding plan view, and Fig. 3 is an end elevation. Fig. 4 is a central vertical section of the compressor. Fig. 5 is a similar section of the device for measuring the ammonia, and Fig. 6 is a plan view of the seat therefor. The remaining figures are on a larger scale. Fig. 7 is a central vertical section of the device for measuring the oil. Fig. 7$^a$ is a horizontal section through a portion on a larger scale. Fig. 8 is a central section of the lower portion of the connecting-rod; and Fig. 9 is an elevation, partly in section, the plane of section being at right angles to that in Fig. 8.

Similar letters of reference indicate corresponding parts in all the figures where they appear.

A is a hollow bed, of cast-iron or other suitable material, and B' is the shaft of an electric motor.

$A^2$ is a triangular frame bolted firmly upon the bed and supporting the compressor mechanism. The latter contains a single-acting pump $A^3$, operated by means of a piston and a piston-rod D, cross-head D', connecting-rod $D^2$, and crank on a main shaft $D^4$, which latter is operated by a large fly-wheel $D^5$, set firmly on the shaft, which fly-wheel serves as a pulley, receiving the required uniform rotatory motion through a belt C, driven by a pulley on the shaft B' by the aid of a tightening-sheave C', which is mounted in a hinged frame $C^2$, controlled by a screw $C^3$, adjusted by a nut $C^4$. On the overhung end of the shaft $D^4$, opposite to the fly-wheel $D^5$, is a worm $D^6$, which gives a slow rotation to mechanism to be described farther on.

The pump or compressor $A^3$ delivers through a pipe $A^4$ the compressed ammonia at a high pressure and high temperature. It flows through a cock $A^5$ into the top of a tall separating vessel E. This vessel receives the hot material tangentially and causes it to traverse spirally downward in the interior. In this movement the oil separates from the gas in the usual and long-approved manner by its gravity and centrifugal force and trickles down the interior of the separator and is pumped out or is otherwise removed from the bottom. The compressed ammonia-gas, separated from the small quantity of oil it contained, flows upward from the pipe E' laterally through a stop-cock E² and downward through a pipe E³ into the coil F in the condenser-tank G, which latter may be a thin vessel requiring only sufficient strength to contain water at ordinary pressure, which water is admitted at the bottom from the street-main or other sources (not shown) through a pipe G', connecting at the bottom, and overflows through a discharge-pipe G² at the top, from whence it is led away through a pipe G³, conveying away the heat which it absorbs from the gas.

It will now be understood that the hot compressed gas is presented to the influence of the cold water in the condenser G by means of a coil F, which is an extension of the pipe E³. It enters at the top and first meets the warmest water, that which is about to be discharged. As it descends in the coil and becomes condensed into the form of liquid ammonia it comes successively into water which is colder, and at the bottom it finds water which is just received at the temperature of the well or other source.

The lower end of the coil F is joined to the base of a separate tank F', which is mounted concentrically within the condenser G and extends a little above it. A pipe F² leads away laterally from the bottom of this tank and upward through a cock F³ and pipe F⁴ into the measuring device H, in which latter a small and exactly-measured quantity is delivered at intervals into a pipe H', from whence it passes upward past a cock H² through a pipe H³ to the evaporating-coils, (not represented, but which it will be understood may be a series of pipes or other proper arrangements for utilizing the intense cold caused by the evaporation of the ammonia,) and thereby cooling the refrigerator or other chamber. (Not shown.)

The mechanism for measuring is shown in Figs. 3, 5, and 6. It acts on the principle fully described in the patent to me dated April 17, 1894, No. 518,541, and consists principally of a slowly-revolving valve J, having cavities or chambers $j$ in its under face and working in tight contact with a stationary bed containing passages through which the ammonia is received and delivered as the cavities $j$ are successively presented to the receiving and delivering apertures. This device $J j$ is turned by a shaft J' and beveled gear-wheel J², which latter receives a uniform slowly-rotating motion from a corresponding beveled gear-wheel I² (dotted lines, Figs. 1 and 2) on a shaft I, which is turned by a worm-wheel I', engaged by the worm D⁶, above referred to, on the main shaft D⁴. The other end of the shaft I, opposite to the bevel-wheel I², carries a crank-arm I³, furnished with a wiper I⁴. At a certain point in each revolution of this slow shaft I this wiper I⁴ touches and tilts a lever K, turning on the fixed center K', which serves to measure oil into the compressing-cylinder by means of the rod K², which receives a vertically-reciprocating motion. The upper end of this rod plays loosely in a guide M*. At each tilting motion of the lever K this rod lifts a piece M, which is inclosed in a casing A⁵, connected to the bottom of the pump A³ and receives oil near the top through a pipe A⁸. It is not necessary in machines of small size to provide large quantities of oil with a view to absorb a portion of the heat of compression. Such heat is conveyed away by the metal and communicated to the air and to other parts. The piece M, which reciprocates within this casing, measures and delivers a sufficient quantity of oil at the proper intervals to lubricate the piston of the pump or compressor and also to pack it. The oil thus measured into the pump also lubricates the bearings of the mechanism below, as will presently appear.

The piece M is cylindrical through the main portion of its length and plays tightly and easily through a stuffing-box in the bottom of the casing A⁵. At a higher level it is flattened on three sides, making it nearly triangular in cross-section. I will designate the three small chambers between these flattened places and the interior of the cylinder as "recesses" $m$. At each elevation of the piece M the cavities $m$ are elevated into a chamber $a$ above, which is kept filled with oil under pressure, and the cavities $m$ become filled. At each descent of the piece M these cavities are moved downward and are in their mid-course completely isolated. As the descent continues the chambers $m$ are presented to the chamber $a'$ below, and the oil escapes downward from the chambers $m$ into the chamber $a'$ and collects in the bottom thereof. From this chamber the oil flows with some increased force after each fresh instalment, but with sufficient uniformity to continuously lubricate and pack the interior of the pump with which this chamber $a'$ communicates.

The stuffing-box for the stem of the oil-feeder M is on the compressor side of said feeder, and the follower $m^*$ of said stuffing-box is confined by the screw-cap M*, which has a tubular extension that receives the upper end of the rod K².

It will be understood that the piston with which the rod D is connected is provided with a self-acting valve opening upward, and at each descent the ammonia-vapor rises through said piston into the space above, and that piston descends so far into the oil as to not only receive the ammonia-vapor, but also a little of the oil. The oil thus finding its way with the ammonia above the piston lubricates and packs the piston. On the termination of the upward motion of the piston most of the oil is delivered with the compressed ammonia and goes out through the pipe $A^4$ to be separated from the ammonia in the vessel E, as before described.

It will be understood that the oil rises through the pipe $A^6$, cock $A^7$, and pipe $A^8$, and fills the upper chamber $a$ under the high tension induced by the action of the compressor and that the pressure in the lower chamber $a'$ is much lower, only equal to that at which the gas is inducted into the compressor. There is a difference of a hundred pounds or more per square inch in the pressure in the two chambers, so that the oil is prompt to move from the upper chamber into the recesses $m$ when they are presented and again by the prompt expansion of the liquid ammonia which it has absorbed to move out of the recesses $m$ into the lower chamber $a'$ when the opportunity is afforded.

M' is a collar on the upper portion of the piece M, the nicely-finished under surface of which matches upon the corresponding face serving as a valve-seat in the base of the upper chamber $a$, so that when the piece M is allowed to descend this collar will fit and make an absolutely tight joint.

There is no occasion for varying the quantity of oil inducted. The recesses $m$ being made of such capacity as to carry down at each movement a little more oil than is necessary for the lubricating and packing, the machine will work for an indefinite period.

Should there be any leakage of oil through the compressor stuffing-box, the oil flowing down lubricates the piston-rod and accumulates in the cup $D^7$. From this it is delivered through a lateral spout $D^8$ into a cup $D^9$, set on a pipe $D^{10}$, communicating with the center opening of the cross-head. Here it lubricates liberally the pin of the cross-head and flows down a little way on the exterior of the connecting-rod $D^2$ to be gathered in a cup $D^{11}$ and led inward through a small hole into a longitudinally-bored hole $d$, extending nearly the whole length of the connecting-rod. The lower end connects with the bearing of the crank-pin and lubricates it liberally. The oil after traversing downward through the whole route and lubricating all these bearings accumulates in a chamber provided in the connecting-rod cap immediately below the crank-pin. A metal wick in this chamber holds the oil in contact with the pin and insures continuous lubrication.

While the details of construction shown in the drawings are the ones I prefer, they are subject to modifications which would not depart from the spirit of the invention and are intended to be included by the claims. I can increase or diminish the capacity of the cavities $m$. I can employ a greater or less number than three cavities.

I claim as my invention—

1. The combination with a reciprocatory valve and an operating-rod therefor, of a stuffing-box for the stem of said valve having a follower and a cap (as M*) for confining the follower of said stuffing-box provided beyond said follower with a tubular extension or guide for the operating-rod, substantially as herein specified.

2. The combination with a vertical compressor and an oil-and-gas separator having a pipe connection therewith, of a valve comprising a casing containing upper and lower chambers communicating with the separator and compressor respectively, a reciprocatory valve controlling the communication between said chambers and having a recess $m$, adapted to be cut off from one chamber when in communication with the other, an operating-rod for said valve having a follower and a cap (as M*) for confining the follower provided beyond said follower with a tubular extension or guide for the operating-rod, and provisions actuated from the compressor-driving devices for intermittently lifting the valve, substantially as herein specified.

3. The combination with the upright compressor, its horizontal main shaft, the oil-feeder, and the ammonia-feeder, of a shaft I, interengaging gears on the overhanging end of said main shaft and the middle of the shaft I respectively, devices on the opposite overhanging ends of said shaft I, respectively, operating mechanism between one of said devices and said oil-feeder, and operating mechanism between the other of said devices and the ammonia-feeder, substantially as described.

4. The upright compressor, its horizontal main shaft, the oil-feeder and the ammonia-feeder, a shaft I, interengaging gears on the overhanging end of said main shaft and the middle of said shaft I respectively, devices on the opposite overhanging ends of said shaft I, operating mechanism between one of said devices and said oil-feeder, operating mechanism between the other of said devices and the oil-feeder, in combination with a condenser supplied with the compressed gas from the compressor and delivering to the ammonia-feeder, substantially as herein specified.

In testimony that I claim the invention above set forth I affix my signature in presence of two witnesses.

LOUIS BLOCK.

Witnesses:
WM. J. SCHWEITZER,
CHAS. W. LAHR.